United States Patent
Alcantar et al.

(10) Patent No.: US 11,305,748 B2
(45) Date of Patent: Apr. 19, 2022

(54) SYSTEM AND METHOD FOR ACTIVATING A SECONDARY AXLE

(71) Applicant: Ford Global Technologies, LLC, Dearborn, MI (US)

(72) Inventors: Jose Velazquez Alcantar, Canton, MI (US); Joseph Jay Torres, Dearborn, MI (US); Matthew John Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 209 days.

(21) Appl. No.: 16/698,006

(22) Filed: Nov. 27, 2019

(65) Prior Publication Data

US 2021/0155219 A1    May 27, 2021

(51) Int. Cl.
| | | |
|---|---|---|
| *B60W 10/119* | (2012.01) | |
| *B60K 17/356* | (2006.01) | |
| *B60K 17/02* | (2006.01) | |
| *B60W 10/02* | (2006.01) | |
| *B60K 23/08* | (2006.01) | |
| *F16D 28/00* | (2006.01) | |
| *B60W 10/08* | (2006.01) | |
| *B60K 17/16* | (2006.01) | |

(52) U.S. Cl.
CPC ........... *B60W 10/119* (2013.01); *B60K 17/02* (2013.01); *B60K 17/165* (2013.01); *B60K 17/356* (2013.01); *B60K 23/08* (2013.01); *B60W 10/02* (2013.01); *B60W 10/08* (2013.01); *F16D 28/00* (2013.01)

(58) Field of Classification Search
CPC .... B60K 17/165; B60K 17/356; B60K 17/02; B60K 23/08; B60W 10/119; B60W 10/02; B60W 10/08
See application file for complete search history.

(56) References Cited

U.S. PATENT DOCUMENTS

| 7,742,852 B1 | 6/2010 | Tang | |
|---|---|---|---|
| 2006/0037802 A1* | 2/2006 | Mori | B60W 10/119 180/233 |

(Continued)

FOREIGN PATENT DOCUMENTS

| JP | 2002070986 A | * | 3/2002 | ............. F16H 48/22 |
|---|---|---|---|---|
| WO | WO-2015093454 A1 | * | 6/2015 | ............... B60K 6/52 |

*Primary Examiner* — Stacey A Fluhart
(74) *Attorney, Agent, or Firm* — David B Kelley; Brooks Kushman P.C.

(57) ABSTRACT

A vehicle includes a primary axle powered by an actuator and a secondary axle powered by a motor. The secondary axle includes a differential, first and second halfshafts, first and second wheels, a first electric clutch selectively coupling the first wheel to the first halfshaft, and a second electric clutch selectively coupling the second wheel to the second halfshaft. A vehicle controller is programmed to: responsive to a request to activate the secondary axle and a first speed difference between the first and second wheels being less than a first threshold, engage the first and second clutches at a same time, and, in response to the request to activate the secondary axle and the first speed difference between the first and second wheels exceeding the first threshold, engage one of the clutches and then subsequently engage the other of the clutches once the one of the clutches is fully engaged.

20 Claims, 5 Drawing Sheets

(56) References Cited

U.S. PATENT DOCUMENTS

2009/0321208 A1   12/2009  Schrand et al.
2010/0025131 A1    2/2010  Gloceri et al.
2018/0223983 A1*  8/2018  Tamura ................. F16H 57/021

* cited by examiner

SYSTEM AND METHOD FOR ACTIVATING A SECONDARY AXLE

TECHNICAL FIELD

The present disclosure relates to all-wheel drive electric vehicle and more specifically to controlling activation of the secondary axle.

BACKGROUND

A vehicle may include an all-wheel-drive system in which a primary drive axle is powered by a primary actuator and a secondary drive axle that is powered by a secondary actuator. The secondary actuator may be deenergized when not needed for vehicle propulsion, however, the actuator and other components of the secondary drive may continue to rotate creating spinning losses. The primary and secondary drives may include an associated differential. A differential allows the left and right wheels to rotate at different speeds to facilitate cornering. Known differentials include open differentials, limited-slip differentials, and locking differentials.

SUMMARY

According to one embodiment, a vehicle includes a primary axle powered by an actuator and a secondary axle powered by a motor. The secondary axle includes a differential, first and second halfshafts connected to the differential, first and second wheels, a first electric clutch selectively coupling the first wheel to the first halfshaft, and a second electric clutch selectively coupling the second wheel to the second halfshaft. A vehicle controller is electrically connected to the first and second clutches and is programmed to: in response to (i) a request to activate the secondary axle and (ii) a first speed difference between the first and second wheels being less than a first threshold, engage the first and second clutches at a same time, and, in response to (i) the request to activate the secondary axle and (ii) the first speed difference between the first and second wheels exceeding the first threshold, engage one of the clutches and then subsequently engage the other of the clutches once the one of the clutches is fully engaged.

According to another embodiment, a vehicle includes a primary axle powered by a primary actuator and a secondary axle powered by a secondary actuator. The secondary axle includes a differential, left and right halfshafts connected to the differential, left and right wheels, a left electric clutch selectively coupling the left wheel to the left halfshaft, and a right electric clutch selectively coupling the right wheel to the right halfshaft. A controller is programmed to, in response to a request to activate the secondary axle and a first speed difference between the left and right wheels exceeding a first threshold, engage the right clutch and subsequently engage the left clutch when the vehicle is accelerating and turning right, and engage the left clutch and subsequently engage the right clutch when the vehicle is accelerating and turning left.

According to yet another embodiment, a vehicle includes a primary axle powered by a primary actuator and a secondary axle powered by a secondary actuator. The secondary axle includes a differential, left and right halfshafts connected to the differential, left and right wheels, a left electric clutch selectively coupling the left wheel to the left halfshaft, and a right electric clutch selectively coupling the right wheel to the right halfshaft. A controller is programmed to, in response to (i) a request to activate the secondary axle, (ii) a first speed difference between the left and right wheels exceeding a first threshold, (iii) the vehicle accelerating, and (iv) the vehicle turning right, command the secondary actuator to speed control in which the secondary actuator is controlled to reduce a second speed difference between the right wheel and the right halfshaft; command the secondary actuator to torque control and engage the right clutch once the second speed difference is less than a second threshold; command, once the right clutch is engaged, the secondary actuator to speed control in which the secondary actuator is controlled to reduce a third speed difference between the left wheel and the left halfshaft; and command the secondary actuator to torque control and engage the left clutch once the third speed difference is less than a third threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
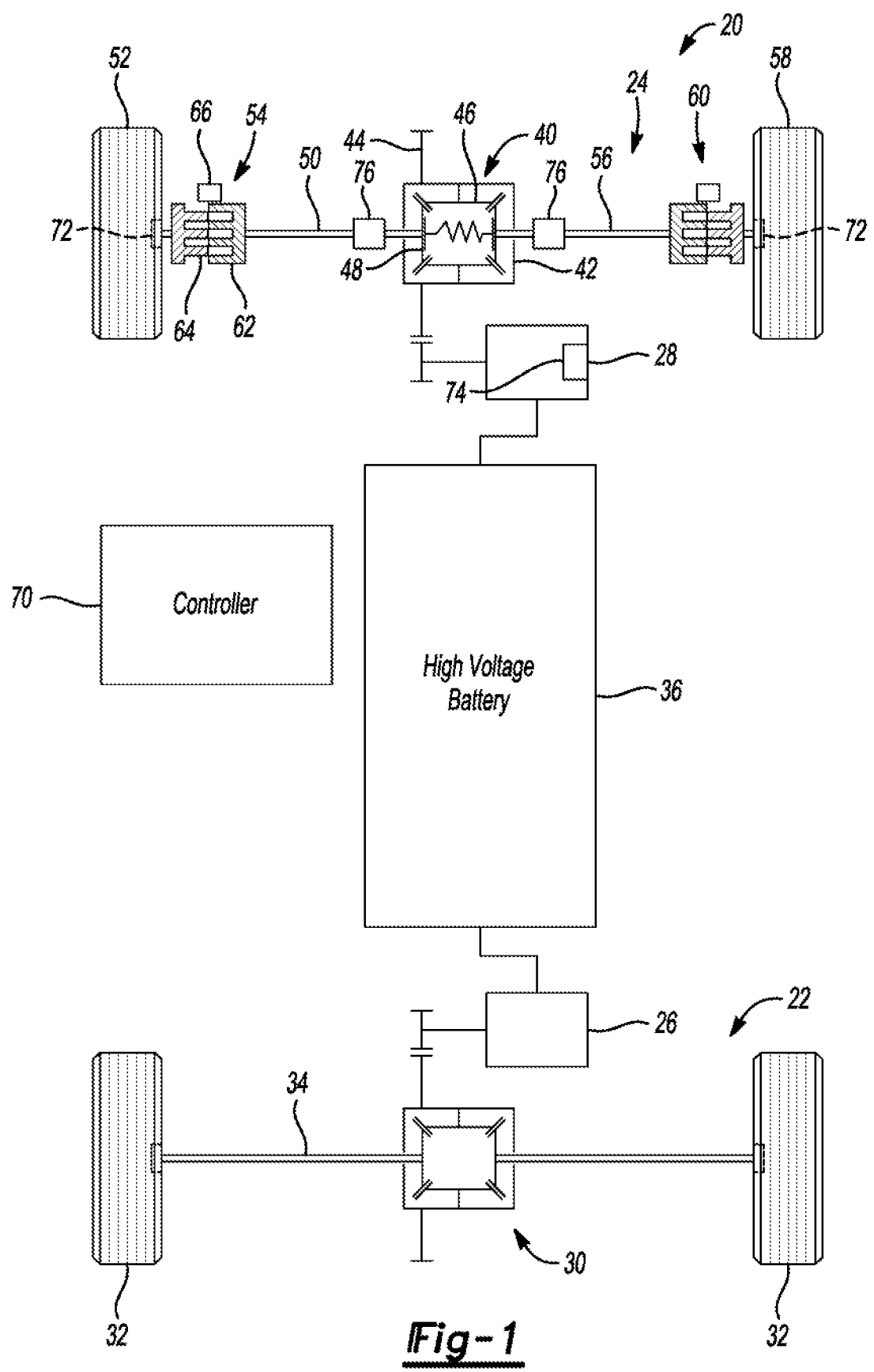
FIG. 1 is a schematic diagram of an electric vehicle having primary and secondary drive axles.

Referring to FIG. 1, an electrified vehicle 20 is illustrated according to an embodiment of the present disclosure. FIG. 1 illustrates representative relationships among the components. Physical placement and orientation of the components within the vehicle may vary. The vehicle 20 may be all-wheel drive and include a primary drive axle 22 and a secondary drive axle 24. The primary drive axle 22 may be the rear axle and the secondary drive axle 24 may be the front axle, or vice versa. The primary drive axle 22 is powered by a primary actuator 26, and the secondary axle 24 is powered by a secondary actuator 28. Example actuators include an internal-combustion engine and an electric motor. The motor may be implemented by a plurality of different types of electric machines. For example, the motor may be an alternating current, permanent magnet synchronous machine. The motor may be configured to operate as a motor to propel the vehicle and to operate as a generator to recapture energy such as during regenerative braking. In the illustrated configuration, both of the primary and secondary actuators 26, 28 are electric motors. In other embodiments, the primary actuator 26 may be an internal-combustion engine, and the secondary actuator 28 may be a motor. The motors 26, 28 are electrically connected to a high-voltage battery 36. Power electronics (not shown) condition direct current (D) power provided by the battery 36 to the requirements of the motor 28. For example, power electronics may provide three-phase AC to the motors. The power electronics are also configured to convert AC power generated by the motors to DC power to recharge the battery 36 such as during regenerative braking.

The primary motor 26 may be coupled to a differential 30. The differential 30 routes torque produced by the motor 26 to the driven wheels 32 via half shafts 34. The differential 30 is configured to allow speed differences between the driven wheels to facilitate cornering of the vehicle. The differential 30 may be an open differential or a limited slip differential.

Secondary axle 24 also includes a differential 40. The differential 40 includes a carrier 42 driveably connected to the secondary actuator 28 via gearing 44. The carrier 42 supports a pair of opposing spider gears 46 and a pair of opposing side gears 48 that mesh with the spider gears 46. Left and right half shafts 50, 56 are connected to associated ones of the side gears 48. Used herein, "left" and "right" are from the vantage point of the driver seat looking forward. For example, the half shafts may be splined to the side gears. The left half shaft 56 is connected to the left wheel 52 by a left disconnect clutch 54, and the right half shaft 56 is connected to the right wheel 58 by a right disconnect clutch 60. The disconnect clutches 54, 60 are disengageable to decouple the secondary axle 24 from the road when the secondary actuator 28 is not being used. This reduces spinning losses and can improve electric range and the like.

The clutches 54 and 60 may each include a first component 62 rotationally fixed to the half shaft and a second component 64 rotationally fixed to the wheel. An engagement mechanism 66 is configured to rotationally couple and decouple the first and second components to engage and disengage the clutch. In one or more embodiments, the clutches 54, 60 are dog clutches that include intermeshing teeth on the first and second components.

The engagement mechanism 66 is electronically controlled by a controller 70. For example, the engagement mechanism may include a motor or solenoid the moves the teeth of the first and second components into engagement to lock the clutch. While illustrated as one controller, the controller 70 may be one or more controllers. It should therefore be understood that the controller 70 and one or more other controllers can collectively be referred to as a "controller" that controls various actuators in response to signals/data from various sensors to control functions such as operating actuators 26, 28, the clutches 54, 60, and the power electronics. The controller 70 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 70 communicates with various sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by the controller 70 within each of the subsystems identified above. Representative examples of parameters, systems, and/or components that may be directly or indirectly actuated using control logic executed by the controller include battery charging, regenerative braking, lift-pedal torque, motor operation, clutch operation, and the like.

The vehicle 20 may include a plurality of sensors communicating input through the I/O interface. The sensors may be used to measure or infer wheel speeds, motor speed, vehicle speed, accelerator pedal position, brake pedal position, and halfshaft speed. For example, the wheels may include wheel speed sensors 72 configured to output data to the controller indicative of a rotational speed of the wheels. The motor 28 may include a resolver 74 that outputs signals indicative of motor speed to the controller 70. The halfshafts 50 and 56 may each include an associated speed sensor 76 configured to output data indicative of rotational speed. The speed sensors 76 are also in electronic communication with the controller 70. The speed sensors 76 may be disposed within the differential housing. The speed sensor 76 may measure the halfshafts or the side gears. The controller is programmed to register these individual speeds and to preform calculations using these speeds as inputs. For example, the controller may calculate average speeds of the wheels and the halfshafts.

The clutches 54, 60 may not include synchronization features; therefore, the speed difference between the halfshafts and their associated wheels must be small to produce smooth engagement of the clutches. The clutches 54, 60 are engaged by rotating the halfshafts with the motor 28 to have a substantial same speed as the wheels. Since the halfshafts are unloaded, the torque required to accelerate them to the desired speed is relatively low, and once the desired speed is achieved, the torque can be reduced to facilitate smooth clutch engagement. The motor 28 is incapable of independently rotating the halfshafts 50, 56 and instead can only affect an average speed of the halfshafts. This is not problematic during straight-line driving as each halfshaft should rotate at roughly the same speed. During cornering, however, the left and right halfshafts have different speeds. To overcome this, the controller 70 is programmed to engage the clutches 54 and 60 at the same time when the speed difference between the left and right wheels 52, 58 is less than a threshold, i.e., the vehicle is driving straight, and to stagger engagement of the clutches 54, 60 when the vehicle is turning, i.e., the speed difference between the left and right wheels exceeds the threshold. In one or more embodiments, during vehicle acceleration, the inside wheel is engaged first and the outside wheel is engage subsequently, and during vehicle slowdown, the outside wheel is engaged first and the inside wheel is engage subsequently. This avoids the need to change direction of halfshaft acceleration during the engagement process.

Figure 2:
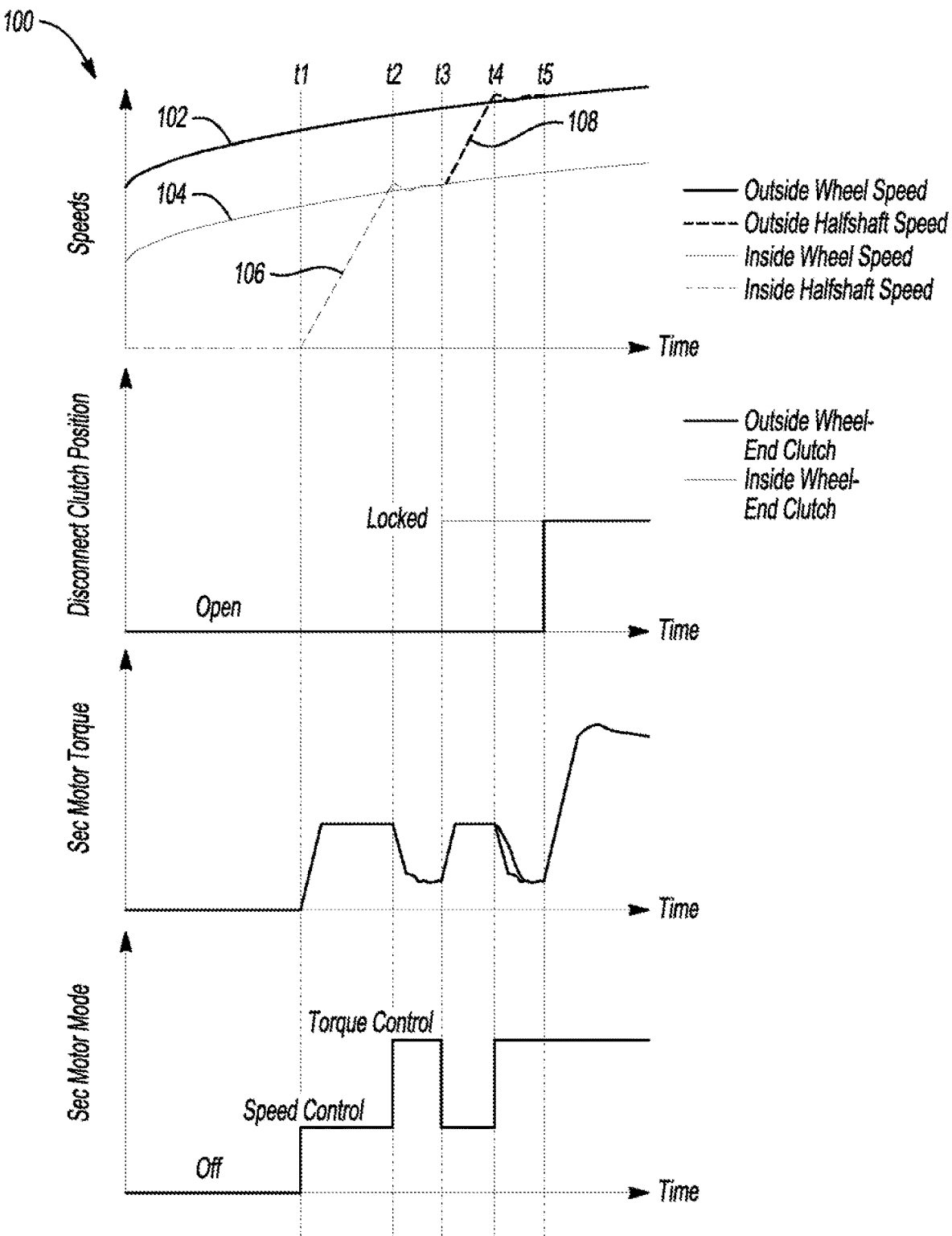
FIG. 2 illustrates plots showing different parameters related to activation of the secondary axle when the vehicle is accelerating.

FIG. 2 illustrates a series of plots 100 showing various parameters during engagement of the clutches 54, 60 when the vehicle 20 is accelerating. In this example, the secondary axle is inactive prior to time T1. At time T1, the controller receives a command to activate the secondary axle 24. The secondary axle 24 is activated by energizing the secondary motor 28 and engaging (locking) the clutches 54, 60. In this example, the command to activate takes place during a corner as shown by the differential between the outside wheel speed 102 and the inside wheel speed 104. As explained above, the clutch engagement will be staggered with the inside wheel being connected first and the outside wheel being connected second. In response to receiving the activation signal, the controller commands the motor 28 to speed control. In speed control, the motor 28 is commanded to a target speed and closed loop controls are used to reduce an error between the target speed and the current motor speed. Here, the target is the speed of the inside wheel. The target may be modified by an offset that is calibratable during testing. At time T2, both halfshafts speeds 106 (both have same speed at this time step) substantially match the inside wheel speed 104, and the motor 28 is switched from speed control to torque control in which the motor torque is controlled to follow the inside wheel speed while producing minimal torque. The clutch associated with the inside wheel is commanded closed and is fully engaged by time T3. Now, the outside wheel will be connected to its associated halfshaft. Once the inside clutch closes, the motor is switched back to speed control with the outside halfshaft being the target speed. The motor increases the speed of the halfshaft towards the outside wheel speed 102 until the error is reduced below a threshold. It is important to note that in an open differential, e.g., differential 40, all torque provided by the traction motor 28 will flow through the path of least resistance, which in this case, is the disconnected halfshaft. As such, all torque provided by the traction motor 28 goes towards accelerating the disconnected outside halfshaft and not towards the connected inside wheel. Speed control of the motor can be used to track the outside wheel speed via feedback control. At time T4, the halfshafts speed 108 substantially matches the wheel speed 104, and the motor is switched back to torque control and the outside clutch is commanded closed. At time T5, the outside clutch is closed and both wheels are now connected to the secondary axle 24. The motor 28 can now be controlled according to driver-demanded torque.

Figure 3:
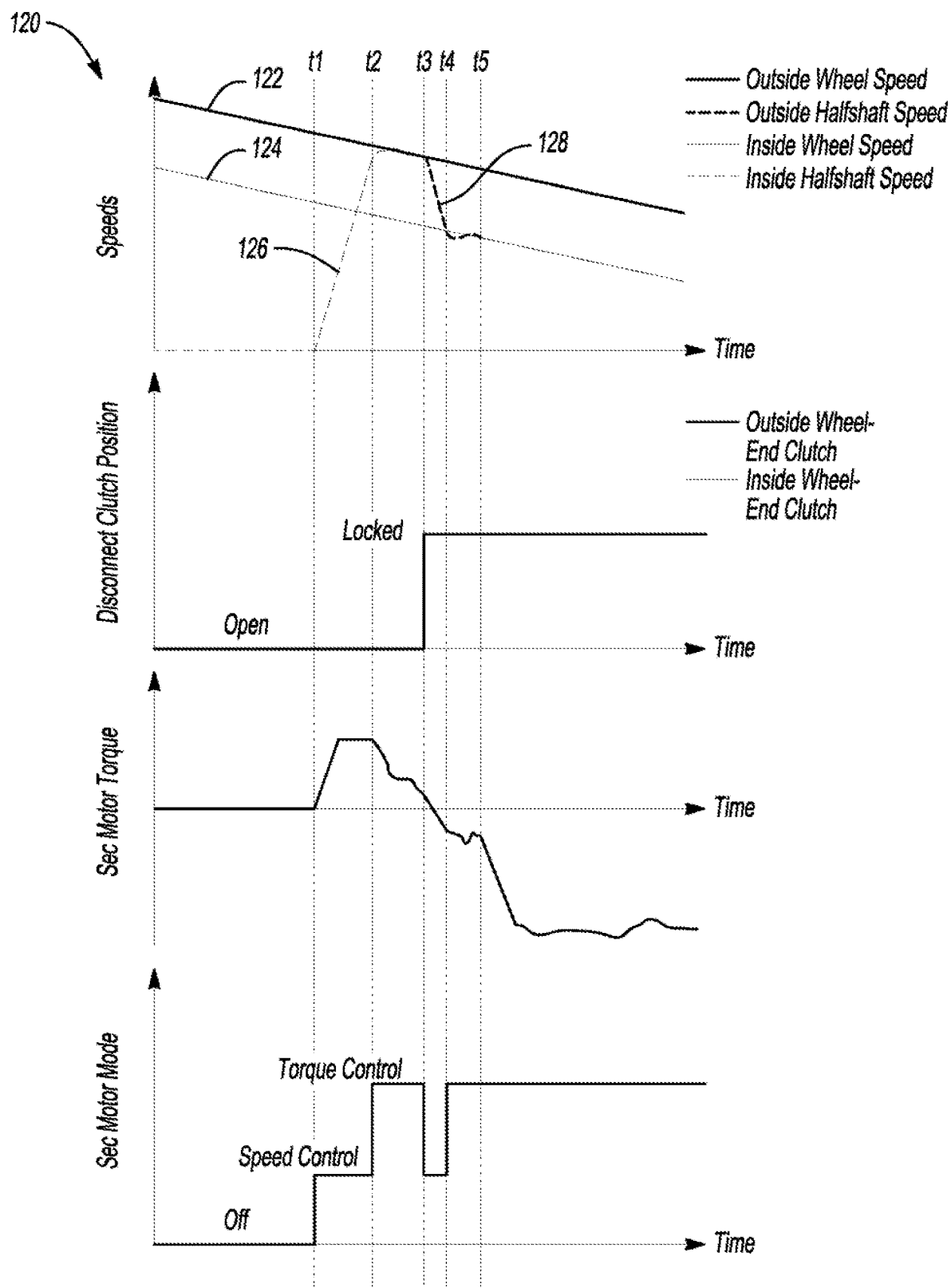
FIG. 3 illustrates plots showing different parameters related to activation of the secondary axle when the vehicle is slowing down.

FIG. 3 illustrates a series of plots 120 showing various parameters during engagement of the clutches 54, 60 when the vehicle 20 is slowing down. The operation is similar to above, except in reverse, with the outside wheel being connected first and the inside wheel being connected second. In this example, the secondary axle 24 is inactive prior to time T1. At time T1, the controller receives a command to activate the secondary axle 24. In this example, the command to activate takes place during a corner as shown by the speed differential between the outside wheel speed 122 and the inside wheel speed 124. In response to receiving the activation signal, the controller commands the motor 28 to speed control and begins accelerating the halfshafts towards the speed target, which is the speed of the outside wheel. At time T2, the halfshafts speeds 126 (both have same speed) substantially match the outside wheel speed 122, and the motor 28 is switched from speed control to torque control in which the motor torque is controlled to follow the outside wheel speed 122 and provide minimal torque. The clutch associated with the outside wheel is commanded closed and is fully engaged at time T3. Now, the inside wheel will be connected to its associated halfshaft. Once the inside clutch is closed the motor is switched back to speed control and the inside halfshaft speed 128 is reduced towards the outside wheel speed 102 by applying a negative torque with the motor 28. At time T4, the inside halfshaft speed 128 substantially matches the wheel speed 124, and the motor is switched back to torque control and the inside clutch is commanded closed. At time T5, the inside clutch is closed and both wheels are now connected to the secondary axle 24.

Control logic or functions performed by controller 70 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 70. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 4A:
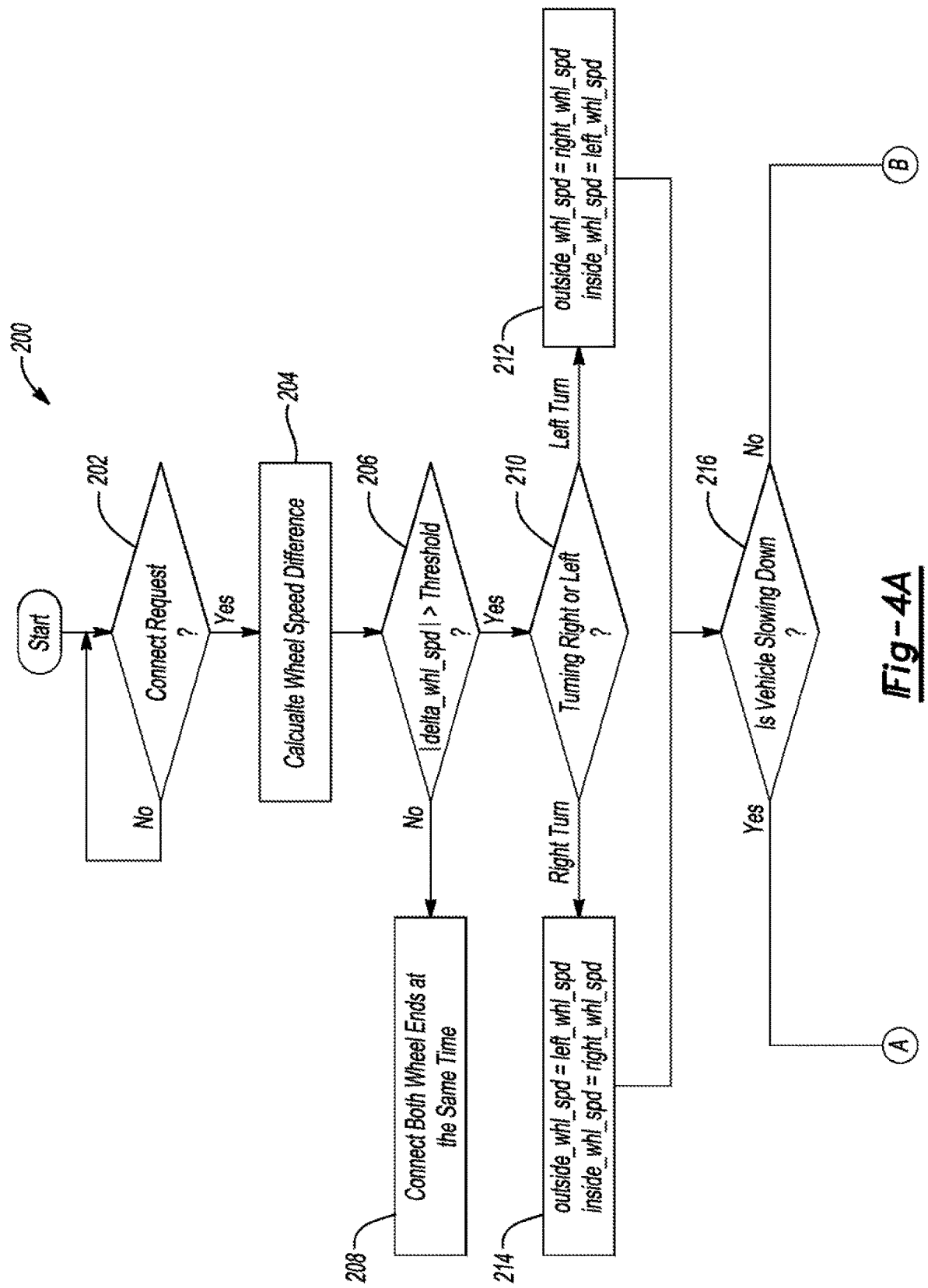
FIGS. 4A and 4B are flow charts of an algorithm for controlling activation of the secondary axle.
Figure 4B:
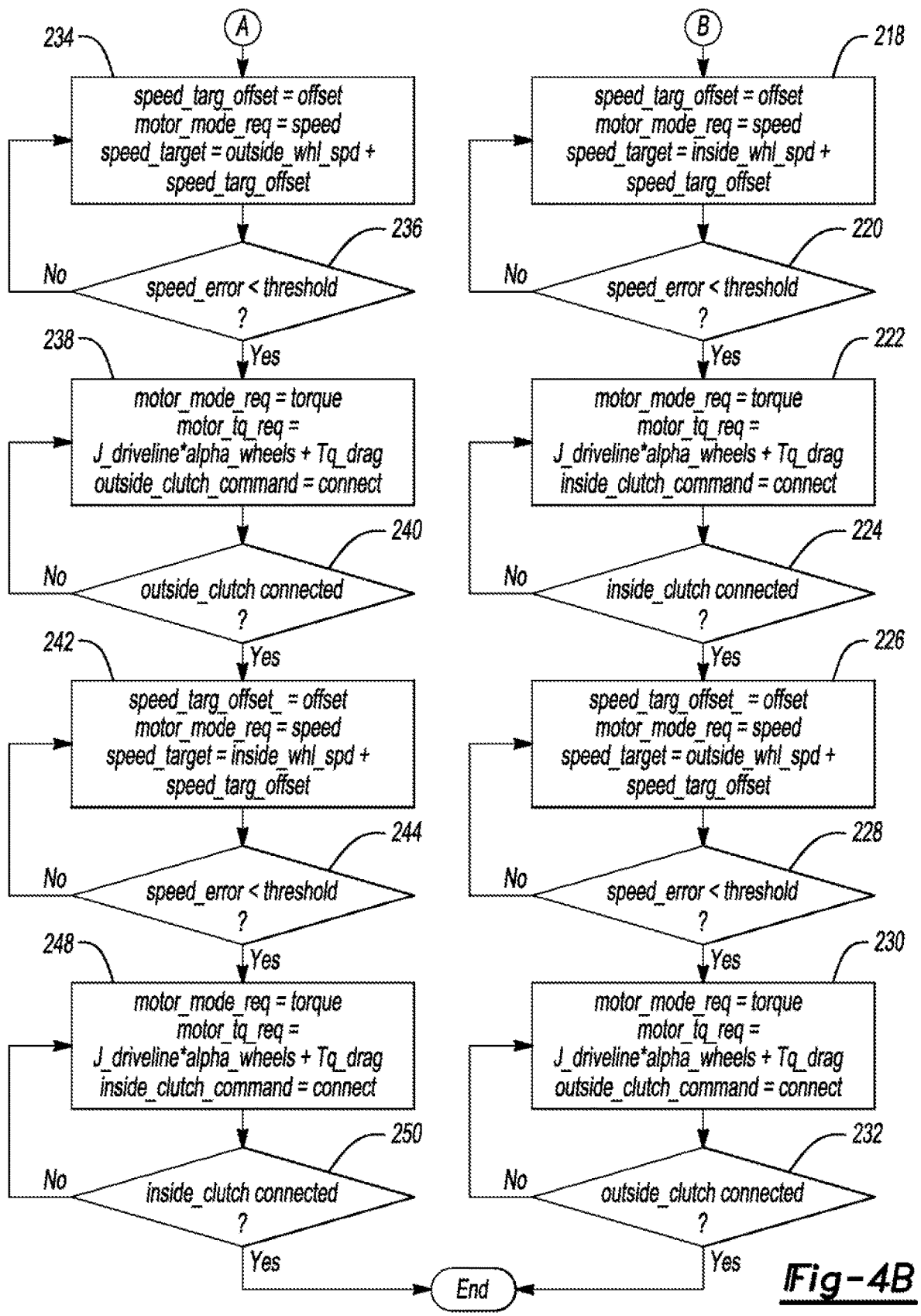

FIGS. 4A and 4B illustrate an example flow chart 200 of an algorithm for controlling activation of the secondary axle 24. Control begins at operation 202 when the controller receives a request to activate the secondary axle. Control then passes to operation 204 where the controller calculates a wheel speed difference between the left and right wheels. Operation 206 determines if the speed difference between the wheels exceeds a threshold, which indicates that the vehicle is turning by a threshold amount. If the vehicle is not turning, i.e., the speed difference is less than the threshold, control passes to operation 208 and the left and right clutches engaged at the same time. The engagement process may include commanding the secondary motor to speed control in which the motor is controlled to reduce an error (speed difference) between the average speed of the halfshafts and an average speed of the wheels. Once a speed difference between the average speed of the wheels and the average speed of the halfshafts is less than a threshold, the motor is commanded to torque control and the clutches are engaged at substantially the same time.

If the vehicle is turning, control passes to operation 210 and the controller determines if the vehicle is turning to the left or to the right. The controller may determine the direction of the turning by comparing wheel speeds of the eft and right wheels 52, 58. For example, if the left wheel 52 is rotating faster than the right wheel 58, the vehicle is turning to the right. The vehicle may also determine turning direction according to a sign (positive or negative) of the difference between the right and left wheel speeds. For example, if the left wheel speed is subtracted from the right wheel speed, and the difference is negative, then the vehicle is turning to the right. These are just examples and other means can be used to determine which direction the vehicle is turning. For example, the controller may also consider at steering wheel angle.

If the vehicle is turning to the left, control passes to operation 212 where the controller sets the right wheel speed as the outside wheel speed and the left wheel speed as the inside wheel speed. At operation 216, the controller determines if the vehicle is slowing down. If no, control passes to operation 218. As discussed above, the inside wheel will be connected first and then the outside wheel will be connected second when the vehicle is accelerating or at constant speed. In operation 218, the motor is commanded to speed control in which the controller controls the motor towards a target speed using closed loop controls for example. Hem, the target speed is equal to the inside wheel speed plus an offset. Since the vehicle is not slowing down, the offset is a positive value, i.e., the speed target will be slightly higher than the inside wheel speed. The slightly higher halfshaft speed helps engagement of the clutch, e.g. prevent ratcheting.

The secondary motor remains in speed control until the speed error is less than a threshold as determined in operation 220. Control then passes to operation 222 and the controller commands the electric motor to torque control, and sets the motor torque based on wheel acceleration, lumped driveline inertia (which is in the wheel domain), and torque drag. At operation 222, the controller also commands the inside clutch to engage. At operation 224, the controller monitors the inside clutch determines when the clutch is fully engaged. Control passes to operation 226 once the inside clutch is fully engaged. At operation 226, the motor is switched to speed control and the controller sets a speed target equal to the outside wheel speed plus an offset. At operation 228, the controller monitors the error between the outside halfshaft speed and the outside wheel speed. Control passes to operation 230 when the speed error is less than the threshold. At operation 230, the motor is switched back to torque control and the outside clutch is commanded to engage. At operation 232 the controller monitors engagement of the clutch. Control ends once the outside clutch is fully engaged.

If the vehicle is slowing down, control passes to operation 234. At operation 234, the motor is placed in speed control and the speeds target is set equal to the outside wheel speed plus an offset. Here, the offset is a negative value since the vehicle is slowing down. The negative offset causes the outside halfshaft to rotate slower than the outside wheel which facilitates engagement of the clutch when the vehicle slowing down. At operation 236, the controller monitors the error between the outside wheel speed and the outside halfshaft speed. Control passes operation 238 when the speed error is less than a threshold. At operation 238, the motor is set to torque control and the outside clutch is commanded to engage. The controller monitors operation of the clutch at operation 240. Control passes to operation 242 once the outside clutch is fully engaged. At operation 242, the motor is placed back into speed control. The speed target is set equal to the inside wheel seed plus a positive offset. (Note that the inside wheel may uses a positive offset unlike the outside wheel that may use a negative offset.) During speed control, the controller monitors the error between the inside halfshaft and the inside wheel. Control passes to operation 246 once the error is reduced below the threshold. At operation 248, the controller places the motor back into torque control and commands the inside clutch to engage. The controller monitors engagement of the clutch at operation 250 and control ends once the inside clutch is fully engaged.

The above-described controls allow the secondary axle to be activated while the vehicle is moving even in instances where the clutches do not include speed-matching devices such as synchronizers. Synchronizers may not be necessary when the above controls are employed because the secondary motor is able to speed match the halfshafts to the wheels even during cornering when the inside and outside wheels and halfshafts have different speeds.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a primary axle powered by an actuator;
   a secondary axle powered by a motor, the secondary axle including a differential, first and second halfshafts connected to the differential, first and second wheels, a first electric clutch selectively coupling the first wheel to the first halfshaft, and a second electric clutch selectively coupling the second wheel to the second halfshaft; and
   a controller electrically connected to the first and second clutches and programmed to:
   in response to (i) a request to activate the secondary axle, (ii) a first speed difference between the first and second wheels being less than a first threshold, and (iii) an average speed of the first and second halfshafts being within a second threshold of the speed difference between the first and second wheels, engage the first and second clutches at a same time, and
   in response to (i) the request to activate the secondary axle and (ii) the first speed difference between the first and second wheels exceeding the first threshold, engage one of the clutches and then subsequently engage the other of the clutches once the one of the clutches is fully engaged.

2. The vehicle of claim 1, wherein the one of the clutches is the first clutch when (i) the vehicle is accelerating and (ii) a speed of the first wheel is less than a speed of the second wheel.

3. The vehicle of claim 2, wherein the one of the clutches is the first clutch when (i) the vehicle is slowing down and (ii) the speed of the first wheel is greater than the speed of the second wheel.

4. The vehicle of claim 1, wherein the controller is further programmed to, in response to (i) the request to activate the secondary axle and (ii) the first speed difference being less than the first threshold, command the motor to speed control in which a second speed difference between an average speed of the halfshafts and an average speed of the wheels is reduced.

5. The vehicle of claim 4, wherein the controller is further programmed to, in response to (i) the request to activate the secondary axle and (ii) the first speed difference exceeding the first threshold,
command the motor to the speed control in which the motor is controlled to reduce a third speed difference between the one of the wheels and the one of the halfshafts associated with the one of the clutches, and
command the secondary motor to torque control until the one of the clutches is engaged in response to the third speed difference being less than a second threshold.

6. The vehicle of claim 4, wherein the controller is further programmed to, in response to (i) the request to activate the secondary axle and (ii) the first speed difference exceeding the threshold,
command the motor to the speed control in which the motor is controlled to reduce a third speed difference between the one of the wheels and the one of the halfshafts associated with the one of the clutches,
in response to the third speed difference being less than a second threshold, command the motor to torque control,
in response to the one of the clutches being engaged, command the motor to the speed control in which the motor is controlled to reduce a fourth speed difference between the other of the wheels and the other of the halfshafts associated with the other of the clutches, and
in response to the fourth speed difference being less than a third threshold, command the motor to torque control.

7. The vehicle of claim 1, wherein the differential includes a carrier driveably connected to the secondary motor, first and second side gears supported by the carrier and connected to the first and second halfshafts, respectively, and a torque-transfer mechanism acting between the first and second side gears and configured to synchronize rotation therebetween.

8. The vehicle of claim 7, wherein the torque-transfer mechanism is a spring having a first end connected to the first side gear and a second end connected to the second side gear.

9. The vehicle of claim 7, wherein the differential is an open differential.

10. The vehicle of claim 1, wherein the one of the clutches is the first clutch when (i) the vehicle is slowing down and (ii) the speed of the first wheel is greater than the speed of the second wheel.

11. A vehicle comprising:
a primary axle powered by a primary actuator;
a secondary axle powered by a secondary actuator, the secondary axle including a differential, left and right halfshafts connected to the differential, left and right wheels, a left electric clutch selectively coupling the left wheel to the left halfshaft, and a right electric clutch selectively coupling the right wheel to the right halfshaft; and
a controller programmed to, in response to a request to activate the secondary axle and a first speed difference between the left and right wheels exceeding a first threshold,
engage the right clutch and subsequently engage the left clutch when the vehicle is accelerating and turning right, and
engage the left clutch and subsequently engage the right clutch when the vehicle is accelerating and turning left.

12. The vehicle of claim 11, wherein the controller is further programmed to, in response to a request to activate the secondary axle and the first speed difference exceeding the first threshold:
engage the left clutch and subsequently engage the right clutch when the vehicle is slowing down and turning right, and
engage the right clutch and subsequently engage the left clutch when the vehicle is slowing down and turning left.

13. The vehicle of claim 11, wherein the controller is further programmed to, in response to the request to activate the secondary axle and the first speed difference between the left and right wheels being less than the first threshold, engage the left and right clutches at a same time when a difference between an average speed of the left and right wheels and an average speed of the left and right halfshafts is less than a second threshold.

14. The vehicle of claim 11, wherein the engage the right clutch further includes:
command the secondary actuator to speed control in which the secondary actuator is controlled to reduce a second speed difference between the right wheel and the right halfshaft, and
in response to the second speed difference being less than a second threshold, command the secondary actuator to torque control and engage the right clutch.

15. The vehicle of claim 14, wherein the subsequently engage the left clutch further includes:
in response to the right clutch being engaged, command the secondary actuator to the speed control in which the secondary actuator is controlled to reduce a third speed difference between the left wheel and the left halfshaft, and
in response to the third speed difference being less than a third threshold, command the secondary actuator to torque control and engage the left clutch.

16. The vehicle of claim 11, wherein the primary and secondary actuators are electric motors.

17. The vehicle of claim 11, wherein the differential includes a carrier driveably connected to the secondary actuator, left and right side gears supported by the carrier and connected to the left and right halfshafts, respectively, and a resilient member acting between the left and right side gears and configured to synchronize rotation therebetween.

18. A vehicle comprising:
a primary axle powered by a primary actuator;
a secondary axle powered by a secondary actuator, the secondary axle including a differential, left and right halfshafts connected to the differential, left and right wheels, a left electric clutch selectively coupling the left wheel to the left halfshaft, and a right electric clutch selectively coupling the right wheel to the right halfshaft; and a controller programmed to, in response to (i) a request to activate the secondary axle, (ii) a first speed difference between the left and right wheels exceeding a first threshold, (iii) the vehicle accelerating, and (iv) the vehicle turning right,
- command the secondary actuator to speed control in which the secondary actuator is controlled to reduce a second speed difference between the right wheel and the right halfshaft,
- command the secondary actuator to torque control and engage the right clutch once the second speed difference is less than a second threshold,
- command, once the right clutch is engaged, the secondary actuator to speed control in which the secondary actuator is controlled to reduce a third speed difference between the left wheel and the left halfshaft, and
- command the secondary actuator to torque control and engage the left clutch once the third speed difference is less than a third threshold.

19. The vehicle of claim 18, wherein the controller is further programmed to,
in response to (i) the request to activate the secondary axle, (ii) the first speed difference exceeding the first threshold, (iii) the vehicle accelerating, and (iv) the vehicle turning left,
- command the secondary actuator to speed control in which the secondary actuator is controlled to reduce the third speed difference between the left wheel and the left halfshaft,
- command the secondary actuator to torque control and engage the left clutch once the third speed difference is less than the third threshold,
- command, once the left clutch is engaged, the secondary actuator to speed control in which the secondary actuator is controlled to reduce the second speed difference between the right wheel and the right halfshaft, and
- command the secondary actuator to torque control and engage the right clutch once the second speed difference is less than the second threshold.

20. The vehicle of claim 19, wherein the controller is further programmed to, in response to (i) the request to activate the secondary axle and (ii) the first speed difference between the left and right wheels being less than the first threshold, engage the left and right clutches at a same time when a difference between an average speed of the left and right wheels and an average speed of the left and right halfshafts is less than a fourth threshold.

* * * * *